United States Patent [19]

Sakamoto et al.

[11] Patent Number: 5,371,116
[45] Date of Patent: Dec. 6, 1994

[54] VULCANIZABLE ORGANOPOLYSILOXANE COMPOSITION

[75] Inventors: Takafumi Sakamoto; Masatoshi Arai; Kei Miyoshi, all of Annaka, Japan

[73] Assignee: Shin-Etsu Chemical Co., Ltd., Tokyo, Japan

[21] Appl. No.: 90,374

[22] Filed: Jul. 13, 1993

[30] Foreign Application Priority Data

Jul. 14, 1992 [JP] Japan ................. 4-209561

[51] Int. Cl.⁵ ................................ C08F 2/46
[52] U.S. Cl. ........................ 522/33; 522/35;
522/41; 522/43; 522/44; 522/46; 522/47;
522/48; 522/65; 522/68; 522/63; 522/70;
522/148; 522/172; 528/17; 528/18; 528/41
[58] Field of Search ............... 528/18, 17, 41; 522/33,
522/35, 41, 43, 44, 46, 48, 47, 65, 68, 63, 70,
148, 172

[56] References Cited

U.S. PATENT DOCUMENTS

| 4,064,027 | 12/1977 | Gant. |
| 4,290,869 | 9/1981 | Pigeon .................................. 528/18 |
| 4,675,346 | 6/1987 | Lin et al. |
| 5,244,938 | 9/1993 | Arai et al. ............................ 528/18 |

FOREIGN PATENT DOCUMENTS

| 392877 | 10/1990 | European Pat. Off. |
| 423717 | 4/1991 | European Pat. Off. |
| 3602490 | 8/1987 | Germany. |
| 52-40334 | 10/1977 | Japan. |
| 53-36515 | 10/1978 | Japan. |
| 58-52351 | 3/1983 | Japan. |
| 60-104158 | 6/1985 | Japan. |
| 60-215009 | 10/1985 | Japan. |

*Primary Examiner*—Melvyn I. Marquis
*Attorney, Agent, or Firm*—Lowe, Price, LeBlanc & Becker

[57] ABSTRACT

Vulcanizable organopolysiloxane compositions comprise a hydroxy-terminated organopolysiloxane, an acrylic or methacrylic functional alkoxy silane, a divalent tin compound, an alkoxy-α-silyl ester, a photopolymerization initiator, and a curing catalyst whereby the composition is cured by UV irradiation and/or by the action of moisture in air. The composition has good shelf stability and can yield rubber elastomers having good physical properties.

10 Claims, No Drawings

VULCANIZABLE ORGANOPOLYSILOXANE COMPOSITION

BACKGROUND OF THE INVENTION

1. Field of The Invention

This invention relates to a vulcanizable organopolysiloxane composition which is both room temperature vulcanizable and photo-vulcanizable in nature. More particularly, the invention relates to a curable or vulcanizable organopolysiloxane which has good shelf stability and is vulcanizable by UV irradiation and/or by means of moisture in air at room temperature thereby providing a cured rubber elastomer having good tensile strength. Such a composition is particularly suitable for use as a sealant, coating agent or potting agent.

2. Description of The Prior Art

A variety of room temperature vulcanizing organopolysiloxane compositions (hereinafter referred to simply as RTV siloxane composition) are known. Among these compositions, there is known a composition which comprises an organopolysiloxane having a hydroxyl group at the ends of the molecular chain along with a crosslinking agent such as methyltrimethoxysilane and an organotitanium compound or a titanium chelating compound as a catalyst. When vulcanized, this composition yields a rubbery organopolysiloxane while producing an alcohol. Thus, this composition is not corrosive without generation of any irritative odor and has been widely used as an adhesive in the fields of electric and electronic industries.

However, this de-alcoholization type of RTV siloxane composition is disadvantageous in that the vulcanizing velocity is generally low with poor internal vulcanizability and poor storage properties. When stored over a long time under water-free conditions, the composition is unlikely to be vulcanized on use. To overcome the above disadvantage, there has been proposed a composition wherein a silane compound having two alkoxy groups is added to the de-alcoholization type of RTV siloxane composition as a so-called silane-type scavenger so as to improve the storage stability and vulcanizability. Moreover, another type of de-alcoholization-type RTV siloxane composition has been proposed in Japanese Laid-open Patent Application No. 58-52351. This composition comprises a diorganopolysiloxane blocked with a hydroxyl group at the ends of the molecular chain, an alkoxysilane or its partial hydrolyzate, a guanidyl-substituted alkoxysilane of the following formula

and an organotin compound.

With the composition to which the silane compound having two alkoxy groups is added as a silane-type scavenger, however, it will be necessary that the silane compound have highly reactive groups such as an amido group, an amino group and the like as hydrolyzable groups other than the two alkoxy groups in order to: impart good storage stability. This will bring about corrosive properties and an offensive odor. Thus, the composition cannot stand use as an adhesive in the electric and electronic industries. In order to overcome the above disadvantage, we have already proposed de-alcoholization-type RTV siloxane compositions which comprise α-silyl ester compounds highly reactive with alcohols, thereby improving the storage stability, and which are substantially free of corrosive properties and offensive odors.

However, the RTV siloxane compositions of the de-alcoholization type have been strongly demanded to increase the vulcanization speed in view of the speeding-up of the production line in the electric and electronic industries.

It is known that in contrast to condensation-type, thermal vulcanization-type and platinum addition reaction-type organopolysiloxane compositions, UV-curing or vulcanizing organopolysiloxane composition has a higher vulcanization speed mechanism. The UV vulcanization type organopolysiloxane compositions known in the art are ones which comprise, for example, a vinyl group-containing polysiloxane and a mercapto group-containing polysiloxane, both being vulcanized through photo-radical addition reaction. Such compositions are set out, for example, in Japanese Patent Publication No. 52-40384 and Japanese Laid-open Patent Application No. 60-104158. However, the compositions have the problems on the offensive odor of the mercapto group and the corrosive properties thereof. Thus, limitation is inconveniently placed on their utility.

Moreover, Japanese Patent Publication No. 53-36515 and Japanese Laid-open Patent Application No. 60-215009 propose photo-curable or vulcanizable compositions which comprise acryl group-containing polysiloxanes and sensitizers. In order to obtain rubbery elastomers, high molecular weight linear polymers have to be used. This is disadvantageous in that the amount of acryl groups positioned at terminal ends becomes relatively very small, adversely influencing the vulcanizability. In addition, the surface moieties which are in contact with air are unlikely to undergo vulcanization owing to the vulcanization inhibiting action of oxygen. Only resin-type products rather than elastomer having a relatively large amount of acryl groups have been put in practice. Thus, satisfactory rubbery elastomers have not been obtained yet.

The above-stated photocurable organopolysiloxane compositions can be vulcanized within a short time by application of UV light. In this sense, such compositions are advantageous in working or handling properties over conventional condensation-type, thermal vulcanization-type or platinum addition reaction-type compositions. However, the resultant silicone rubber elastomer exhibits poor tensile strength and is snort of shelf stability, with its application being inconveniently limited.

SUMMARY OF THE INVENTION

It is accordingly an object of the invention to provide a vulcanizable organopolysiloxane composition which is vulcanizable by application of UV light and/or by the action of moisture in air at room temperature.

It is another object of the invention to provide a vulcanizable organopolysiloxane composition which is able to provide a vulcanized elastomer product having high tensile strength and good heat resistance, weatherability and low temperature characteristics, thus having wide utility in various fields.

It is a further object of the invention to provide a vulcanizable organopolysiloxane composition which has good shelf stability while preventing it from thickening and gelation during storage.

The above objects can be achieved, according to the invention, by a vulcanizable organopolysiloxane composition which comprises:
(A) a hydroxy-terminated organopolysiloxane of the following general formula (1)

$$\text{HO}-(\underset{\underset{R^1}{|}}{\overset{\overset{R^1}{|}}{\text{SiO}}})_n-\text{H} \quad (1)$$

wherein each $R^1$ independently represents an unsubstituted or substituted monovalent organic group, and n is an integer of from 1 to 10,000;
(B) a acrylic or methacrylic functional alkoxysilane of the following general formula (2)

$$\text{CH}_2=\underset{\underset{O}{\|}}{\overset{\overset{R^2}{|}}{\text{C}}}\text{CO}-R^3-\underset{}{\overset{\overset{R^4{}_a}{|}}{\text{Si}}}(OR^5)_{3-a} \quad (2)$$

wherein $R^2$ represents a hydrogen atom or a methyl group, $R^3$ represents an unsubstituted or substituted divalent organic group, $R^4$ and $R^5$ independently represent an unsubstituted or substituted monovalent organic group, and a is a value of 0, 1 or 2;
(C) a divalent tin compound of the following general formula (3)

$$\text{SnX}_2 \quad (3)$$

wherein each X independently represents a halogen atom, an $OR_6$ group or an $$\underset{\underset{O}{\|}}{\overset{}{\text{OCR}^7}}$$

group
in which $R^6$ and $R^7$ independently represent an unsubstituted or substituted monovalent organic group;
(D) an alkoxy-α-silyl ester of the following general formula (4)

$$(R^8O)_{3-b}\underset{}{\overset{\overset{R^9{}_b}{|}}{\text{Si}}}-\underset{\underset{R^{11}}{|}}{\overset{\overset{R^{10}}{|}}{\text{C}}}-\underset{\underset{O}{\|}}{\overset{}{\text{C}}}-O-R^{12} \quad (4)$$

wherein $R^8$ and $R^9$ independently represent a methyl group or an ethyl group, $R^{10}$ and $R^{11}$ independently represent a hydrogen atom or an unsubstituted or substituted monovalent organic group, $R^{12}$ represents an unsubstituted or substituted monovalent organic group, and b is a value of 0, 1 or 2;
(E) an effective amount of a photopolymerization initiator; and
(F) an effective amount of a catalyst for vulcanization whereby the composition is vulcanizable by the action of moisture in air at room temperature and/or by application of UV light.

The invention is based on the finding that when the hydroxy-terminated organopolysiloxane of the above general formula (1), an acrylic or methacrylic functional alkoxysilane of the above general formula (2), a divalent tin compound of the above general formula (3), and an alkoxy-α-silyl ester of the general formula (4) are formulated in combination, the resultant composition has a pronouncedly increased shelf stability. More particularly, when the composition is allowed to stand at a high temperature of 70° C. for seven days, it is substantially free of thickening or gelation. Accordingly, when the composition after the standing is cured, the resultant rubber elastomer has physical properties substantially the same as those properties obtained from a composition which has been applied immediately after its preparation. In addition, when the composition is irradiated with UV Light, it can be spontaneously vulcanized to an extent and then condensed to complete the vulcanization, thereby providing a silicone elastomer having good tensile strength.

DETAILED DESCRIPTION AND EMBODIMENTS OF THE INVENTION

The respective essential ingredients of the composition according to the invention are first described.

The organopolysiloxane (A) used in the composition of the present invention is a compound of the following formula (1)

$$\text{HO}-(\underset{\underset{R^1}{|}}{\overset{\overset{R^1}{|}}{\text{SiO}}})_n-\text{H} \quad (1)$$

wherein each $R^1$ independently represents an unsubstituted or substituted monovalent organic group, and n is an integer of from 1 to 10,000. Preferably, $R^1$ independently represents a monovalent hydrocarbon group having from 1 to 10 carbon atoms, more preferably from 1 to 8 carbon atoms. Specific examples include an alkyl group such as a methyl group, an ethyl group, or a propyl group to decyl group, an alkenyl group such as a vinyl group, an allyl group and the like, an aryl group such as a phenyl group, a tolyl group or the like, an aralkyl group such as a benzyl group, a 2-phenylethyl group or the like, and Those groups indicated above wherein part or all of the hydrogen atoms are substituted with a halogen atom, e.g. a chloromethyl group, a 3,3,3-trifluoropropyl group and the like. Typical examples of the organopolysiloxane include compounds of the following formulas wherein Me represents a methyl group, and Ph represents a substituted or unsubstituted phenyl group

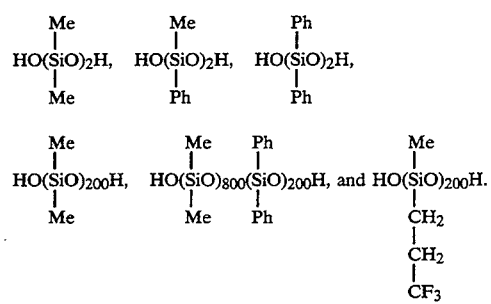

The organopolysiloxane (A) should preferably have a viscosity of 25 centipoises or over at 25° C.

The acrylic or methacrylic functional alkoxysilane (B) is of the general formula (2)

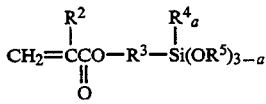 (2)

wherein $R^2$ represents a hydrogen atom or a methyl group, $R^3$ represents a unsubstituted or substituted divalent organic group, $R^4$ and $R^5$ may be the same or different and represent an unsubstituted or substituted monovalent organic group, and a is a value of 0, 1 or 2. The organic group represented by $R^3$ should preferably have 1 to 10 carbon atoms, more preferably from 1 to 8 carbon atoms. Specific examples include alkylene groups such as a methylene group, a propylene group and the like, an alkenylene such as a vinylene group, an allylene group and the like, an arylene group such as a phenylene group, a tolylene group or the like, an aralkylene group such as a benzylidene group, a 2-phenylethylene group or the like. The organic group represented by $R^4$ and $R^5$ should preferably have 1 to 10 carbon atoms, more preferably from 1 to 8 carbon atoms and includes groups similar to the groups defined with respect to $R^1$. Specific examples of the alkoxysilane (B) include compounds of the formulas indicated below

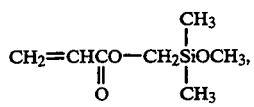

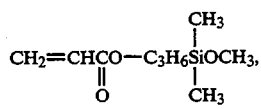

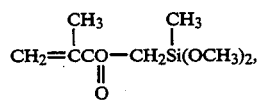

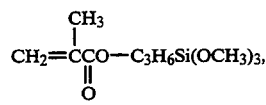

The amount of the (B) ingredient is not critical and is preferably in the range of from 0.1 to 10 parts by weight (hereinafter referred to simply as parts) per 100 parts of the (A) ingredient.

The divalent tin compound (C) is of the following general formula (3)

$$SnX_2 \qquad (3)$$

wherein X represents a halogen atom, an $OR^6$ group or an $OCOR^7$ group wherein $R^6$ and $R^7$ independently represent an unsubstituted or substituted monovalent organic group. The organic group preferably includes a monovalent hydrocarbon group having preferably from 1 to 15 carbon atoms, more preferably from 1 to 7 carbon atoms. Most preferably, the hydrocarbon group includes an alkyl group having carbon atoms defined above. Examples of the halogen atom include Cl, Br and I. Specific examples of the tin compound include $SnCl_2$, $SnBr_2$, $SnI_2$,

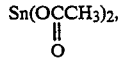

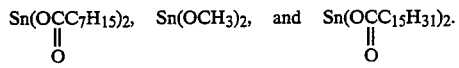

The (C) ingredient is not critical with respect to the amount and is preferably in the range of from 0.01 to 5 parts, more preferably from 0.01 to 2 parts, per 100 parts of the (A) ingredient. If the amount is less than 0.01 part, the catalytic function does not work satisfactorily. If the amount is over 5 parts, the shelf stability of the resultant composition may be lowered.

The alkoxy-α-silyl ester (D) is of the following general formula (4)

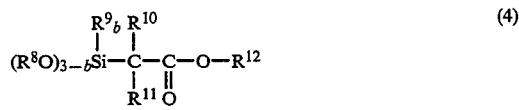 (4)

wherein $R^8$ and $R^9$ independently represent a methyl group or an ethyl group. $R^{10}$ and $R^{11}$ independently represent a hydrogen atom or an unsubstituted or substituted monovalent organic group. $R^{12}$ represents an unsubstituted or substituted monovalent organic group, and b is a value of 0, 1 or 2. The monovalent Organic group represented by $R^{10}$ and $R^{11}$ should preferably be a monovalent hydrocarbon group having from 1 to 10 carbon atoms, more preferably from 1 to 8 carbon atoms. The monovalent organic group represented by $R^{12}$ is similar to that represented by $R^{10}$ and $R^{11}$. Examples of these organic groups are similar to those defined hereinbefore with respect to $R^1$.

Specific examples of the silyl ester include those compounds of the following formulas wherein Me represents a methyl group, Et represents an ethyl group, $^n$BU represents an n-butyl group, and Ph represents a phenyl group.

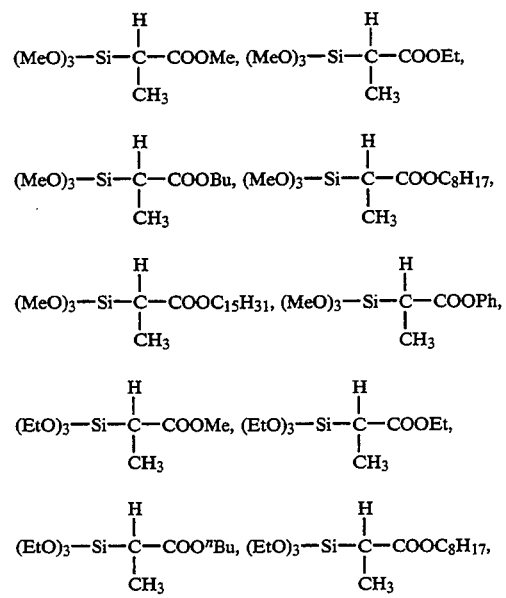

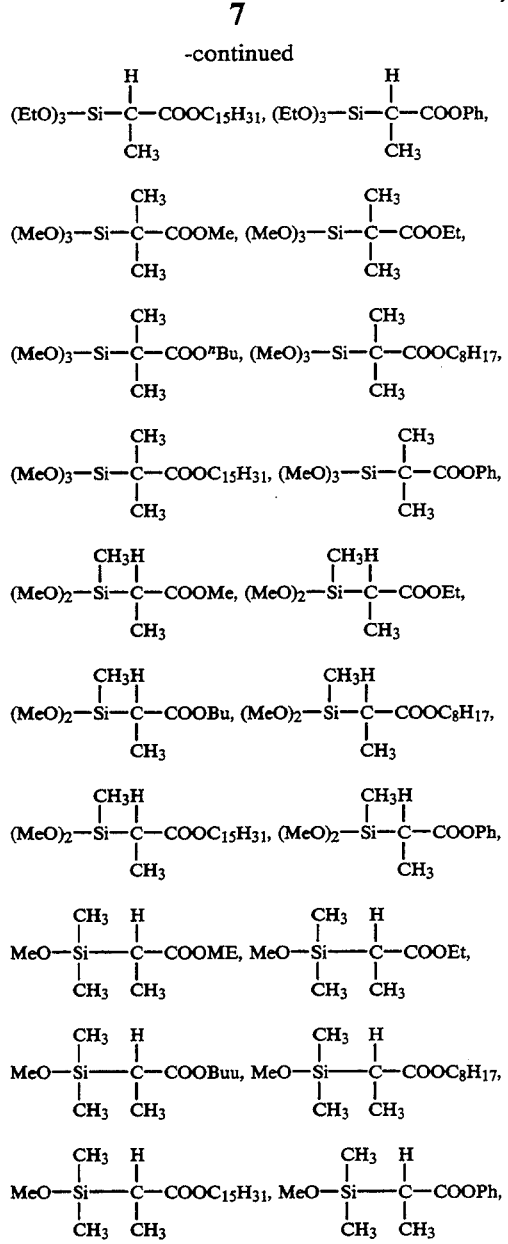

The amount of the alkoxy-α-silyl ester of the formula (4) is not critical and is preferably in the range of from 0.1 to 10 parts per 100 parts of the (A) ingredient.

The photopolymerization initiator (E) used in the present invention serves to facilitate photopolymerization of the acrylic or methacrylic groups of the (B) ingredient. Such photopolymerization initiators may be known ones used for this purpose and include, for example, acetophenone, propiophenone, benzophenone, xanthol, fluorene, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxyketal, 2-chloroxanthone, diethylacetophenone, 1-hydroxycyclohexyl phenyl ketone, 2-methyl[4-(methylthio)phenyl]2-morpholino-1-propanone, 2,2-dimethoxy-2-phenylacetophenone, diethoxyacetophenone, and the like. If the initiator is used in an amount of less than 0.01 part per 100 parts of the (A) ingredient, the effect of the addition is not satisfactory. On the contrary, when the amount exceeds 10 parts, the resultant cured silicone rubber has low strength. Thus, physical properties may not be good. The amount is in the range of from 0.01 to 10 parts, preferably from 0.1 to 5 parts, per 100 parts of the (A) ingredient.

The (F) ingredient facilitates curing or vulcanization with the acrylic or methacrylic functional alkoxysilane (B) and the alkoxy-α-silyl ester (D). The curing catalyst may be those compounds ordinarily used for silicone resin compositions which are cured in the presence of moisture. Such compounds include, for example, tin compounds and titanium compounds. The tin compound catalysts include, for example, dibutyltin diacetate, dibutyltin dioctoate, dibutyltin dilaurate, dibutyltin dioleate, diphenyltin diacetate, dibutyltin dioxide, dibutyltin dimethoxide, dibutylbis(triethoxysiloxy)tin, dibutyltinbenzyl maleate and the like. Examples of the titanium compound catalyst include titanic esters and titanium chelating compounds such as tetraisopropoxy titanium, tetra-n-butoxy titanium, tetrabis(2-ethylhexoxy) titanium, dipropoxybis(acetylacetona) titanium, titanium isopropoxyoctylene glycol and the like.

The amount of the (F) ingredient is generally in the range of from 0.01 to 10 part, preferably from 0.1 to 2 parts, per 100 parts of The (A) ingredient. If the amount is less than 0.01 part, the ingredient does not satisfactorily function as the catalyst, resulting in a longer curing time. In addition, the curing to the depth of a rubber layer may become unsatisfactory. When the amount exceeds 10 parts, the shelf stability of the resultant composition is liable to lower.

The composition of the invention can be obtained by uniformly mixing the ingredients (A) to (F). The composition may further comprise fillers such as fumed silica which does not impede photo-vulcanization, if necessary, in order to improve mechanical properties of final silicone rubber elastomers. In order to control physical properties, thixotropic agents, heat-resistance modifiers, colorants, adhesiveness-imparting agents may be added, if required.

In the composition of the invention, the (B) ingredient has selectively an acrylic or methacrylic oxyorganosilyl group. When UV light is irradiated, the composition can be cured within a short time, for example, of 1 to 20 seconds by the action of the photopolymerization initiator (E) on the acrylic or methacrylic oxyorganosilyl group. Moreover, the composition is also curable at room temperature, thereby providing a silicone rubber elastomer by the action of the catalyst (D) on the alkoxy-α-silyl ester (F). The improvement in the shelf stability of the composition of the invention results from the combination of the divalent tin compound (C) and the alkoxy-α-silyl ester (D).

The vulcanizable organopolysiloxane composition of the invention has the alkoxy groups and has thus a nature as an alkoxy-functional organopolysiloxane which is useful as a modifier for inorganic or organic materials, a surface treating agent and a base material for de-alcoholization-type vulcanizable silicone resins or rubbers. At the same time, since the acrylic or methacrylic group is contained in the ingredient (B), the composition is vulcanized by UV irradiation. After the vulcanization, the elastomer exhibits the properties of the acrylic or methacrylic functional organopolysiloxane and can be appropriately used as sealants, coating agents, potting agents, adhesives or the like. Thus, the composition of the invention has great utility in industrial fields.

The present invention is more particularly described by way of examples. Comparative examples are also shown. In these examples and comparative examples, the viscosity is a measurement at 25° C.

EXAMPLE 1

10 parts of fumed silica, 1.7 parts of methacryloxypropyltrimethoxysilane, 0.1 part of tin dioctoate, 3 parts of 2-ethylhexyl 2-trimethoxysilylpropionate, 2 parts of diethoxyacetophenone and 0.5 parts of dibutyltin dilaurate were added to 100 parts of a polydimethylsiloxane terminated with a hydroxy group at ends thereof and having a viscosity of 5000 cps., thereby obtaining Composition 1.

COMPARATIVE EXAMPLE 1

10 parts of fumed silica, 1.7 parts of methacryloxypropyltrimethoxysilane, 0.1 part of tin dioctoate, 2 parts of diethoxyacetophenone and 0.5 parts of dibutyltin dilaurate were added to 100 parts of a polydimethylsiloxane terminated with a hydroxy group at ends thereof and having a viscosity of 5000 cps., thereby obtaining Composition 2.

COMPARATIVE EXAMPLE 2

10 parts of fumed silica, 1.7 parts of methacryloxypropyltrimethoxysilane, 0.1 part of tetraisopropoxy titanium, 3 parts of 2-ethylhexyl 2-trimethoxysilylpropionate, 2 parts of diethoxyacetophenone and 0.5 parts of dibutyltin dilaurate were added to 100 parts of a polydimethylsiloxane terminated with a hydroxy group at ends thereof and having a viscosity of 5000 cps., thereby obtaining Composition 3.

Compositions 1 to 3 were each cured by irradiation of UV light at a speed of 1 m/minute three times by use of a UV irradiator, ASE-20, available from Nippon Denchi K. K. Thirty minutes after the curing, physical properties (hereinafter referred to as UV physical properties) were determined. Further, the cured products were, respectively, allowed to stand for 7 days under conditions of 20°±3° C. and 55±5% R.H. (hereinafter referred to UV+RTV physical properties).

Moreover, Compositions 1 to 3 were each allowed to stand for 7 days under conditions of 20°±3° C. and 55±5% R.H. without UV irradiation, thereby obtaining a cured product. The respective products were subjected to measurement of physical properties (hereinafter referred to as RTV physical properties). In addition, Compositions 1 to 3 were each kept under hearing conditions of 70° C. for 7 days and then subjected to curing and measurement of the products in the same manner is set out above. The results are shown in Table below.

TABLE

|  | Example 1 Composition 1 | | | Comp. Ex. 1 Composition 2 | | | Comp. Ex. 2 Composition 3 | | |
| --- | --- | --- | --- | --- | --- | --- | --- | --- | --- |
| Composition: | | | | | | | | | |
| dimethylpolysiloxane | 100 | | | 100 | | | 100 | | |
| methacryloxypropyltrimethoxysilane | 1.7 | | | 1.7 | | | 1,.7 | | |
| tin dioctoate | 0.1 | | | 0.1 | | | — | | |
| tetraisopropxy titanium | — | | | — | | | 0.1 | | |
| diethoxyacetophenone | 2 | | | 2 | | | 2 | | |
| 2-ethylhexyl trimethoxysilylpropionate | 3 | | | — | | | 3 | | |
| dibutyltin dilaurate | 0.5 | | | 0.5 | | | 0.5 | | |
| silica | 10 | | | 10 | | | 10 | | |
| viscosity (poises/25° C.) | 800 | | | 1000 | | | non-sagging | | |
| Physical Properties of Rubber Elastomers: | | | | | | | | | |
|  | UV | UV + RTV | RTV | UV | UV + RTV | RTV | UV | UV + RTV | RTV |
| Initial Properties: | | | | | | | | | |
| hardness (JIS-A) | 32 | 38 | 18 | 33 | 39 | — | 22 | 30 | 28 |
| elongation (%) | 150 | 140 | 170 | 140 | 120 | — | 200 | 150 | 170 |
| tensile st. (kgf/cm$^2$) | 13 | 20 | 8 | 13 | 16 | — | 6 | 13 | 11 |
| Properties After Storage: | | | | | | | | | |
| hardness (JIS-A) | 33 | 38 | 19 | | | | | | |
| elongation (%) | 140 | 130 | 180 | gelled | | | thickened or gelled | | |
| tensile st. (kgf/cm$^2$) | 14 | 19 | 9 | | | | | | |

As will be apparent from the above results, the organopolysiloxane composition of the invention is appropriately vulcanized by UV irradiation and/or the action of moisture at room temperature. Nevertheless, the composition of the invention has good shelf stability and is substantially free of thickening or gelation during storage. The rubber elastomer product obtained from the composition has good heat resistance, weatherability and low temperature characteristics inherent to silicone rubber.

What is claimed is:

1. A vulcanizable organopolysiloxane composition which comprises:

(A) a hydroxy-terminated organopolysiloxane of the following general formula (1)

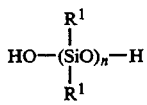

wherein each $R^1$ independently represents an unsubstituted or substituted monovalent organic group, and n is an integer of from 1 to 10,000;

(B) an acrylic or methacrylic functional alkoxysilane of the following general formula (27)

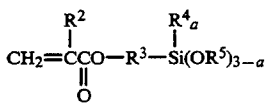

wherein $R^2$ represents a hydrogen atom or a methyl group, $R^3$ represents an unsubstituted or substituted divalent organic group, $R^4$ and $R^5$ independently represent an unsubstituted or substituted monovalent organic group, and a is a value of 0, 1 or 2;

(C) a divalent tin compound of the following general formula (3)

$$SnX_2 \qquad (3)$$

wherein each X independently E represents a halogen atom, an $OR^6$ or an

group
in which $R^6$ and $R^7$ independently represent an unsubstituted or substituted monovalent organic group;

(D) an alkoxy-α-silyl ester of the following general formula (4)

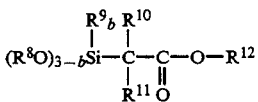

wherein $R^8$ and $R^9$ independently represent a methyl group or an ethyl group, $R^{10}$ and $R^{11}$ independently represent a hydrogen atom or an unsubstituted or substituted monovalent organic group, $R^{12}$ represents an unsubstituted or substituted monovalent organic group, and b is a value of 0, 1 or 2;

(E) an effective amount of a photopolymerization initiator for photopolymerization of said alkoxysilane (B), said photopolymerization initiator being selected from the group consisting of acetophenone, propiophenone, benzophenone, xanthol, fluorene, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxyketal, 2-chloroxanthone, diethylacetophenone, 1-hydroxycyclohexyl phenyl ketone, 2-methyl[4-(methylthio)phenyl]2-morpholino-1-1-propanone, 2,2-dimethoxy-2-phenylacetophenone, and diethoxyacetophenone; and (F) an effective amount of a catalyst for vulcanization of said alkoxysilane (B) and said alkoxy-α-ester (D) whereby the composition is vulcanizable by the action of moisture in air at room temperature and/or by application of UV light, said catalyst for vulcanization being selected from the group consisting of dibutyltin diacetate, dibutyltin dioctoate, dibutyltin dilaurate, dibutyltin dioleate, diphenyltin diacetate, dibutyltin dioxide, dibutyltin dimethoxide, dibutylbis(triethoxysiloxy)tin, dibutyltinbenzyl maleate, tetraisopropoxy, titanium, tetra-n-butoxy titantium, tetrabis (2-ethylhexoxy) titanium, dipropoxybis (acetylacetona) titanium and titanium isopropoxyoctylene glycol.

2. A vulcanizable organopolysiloxane composition according to claim 1, wherein each $R^1$ independently represents an unsubstituted or substituted monovalent hydrocarbon group having from 1 to 10 carbon atoms.

3. A vulcanizable organopolysiloxane composition according to claim 1, wherein said organopolysiloxane has viscosity of not smaller than 25 centipoises at 25° C.

4. A vulcanizable organopolysiloxane composition according to claim 1, wherein $R^3$ is a divalent hydrocarbon group having from 1 to 10 carbon atoms and $R^4$ and $R^5$ independently represent a monovalent hydrocarbon group having from 1 to 10 carbon atoms.

5. A vulcanizable organopolysiloxane composition according to claim 1, wherein X of the ingredient (C) is a halogen atom.

6. A vulcanizable organopolysiloxane composition according to claim 1, wherein X of the ingredient (C) is a group of $OR^6$ or $OCOR^7$ wherein $R^6$ and $R^7$, respectively, represent an unsubstituted or substituted monovalent hydrocarbon group having from 1 to 15 carbon atoms.

7. A vulcanizable organopolysiloxane composition according to claim 1, wherein $R^{10}$ and $R^{11}$ of the ingredient (D), respectively, represent an unsubstituted or substituted monovalent hydrocarbon group having from 1 to 10 carbon atoms.

8. A vulcanizable organopolysiloxane composition according to claim 1, wherein said composition comprises 100 parts by weight of said hydroxy-terminated organopolysiloxane, from 0.1 to 10 parts by weight of said acrylic or methacrylic functional alkoxysilane, from 0.01 to 5 parts by weight of said divalent tin compound, from 0.1 to 10 parts by weight of said alkoxy-α-silyl ester, from 0.01 to 10 parts by weight of said photopolymerization initiator, and from 0.01 to 10 parts by weight of said catalyst for vulcanization.

9. A vulcanized product obtained from the composition of claim 1.

10. A vulcanizable organopolysiloxane composition which comprises:

(A) a hydroxy-terminated organopolysiloxane of the following general formula (1)

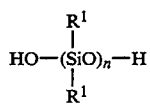

wherein each $R^1$ independently represents an unsubstituted or substituted monovalent organic group, and n is an integer of from to 10,000;

(B) an acrylic or methacrylic functional alkoxysilane of the following general formula (2)

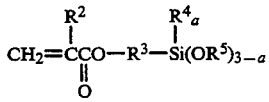
(2)

wherein $R^2$ represents a hydrogen atom or a methyl group, $R^3$ represents an unsubstituted or substituted divalent organic group, $R^4$ and $R^5$ independently represent an unsubstituted or substituted monovalent organic group, and a is a value of 0, 1 or 2;

(C) a divalent tin compound of the following general formula (3)

$$SnX_2 \quad (3)$$

wherein each X independently represents a halogen atom, an $OR^6$ or an

group in which $R^6$ and $R^7$ independently represent an unsubstituted or substituted monovalent organic group;

(D) an alkoxy-α-silyl ester of the following general formula (4)

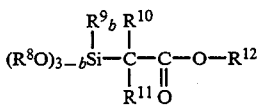
(4)

wherein $R^8$ and $R^9$ independently represent a methyl group or an ethyl group, $R^{10}$ and $R^{11}$ independently represent a hydrogen atom or an unsubstituted or substituted monovalent organic group, $R^{12}$ represents an unsubstituted or substituted monovalent organic group, and b is a value of 0, 1 or 2;

(E) an effective amount of a photopolymerization initiator for photopolymerization of said alkoxysilane (B); and (F) an effective amount of a catalyst for vulcanization of said alkoxysilane (B) and said alkoxy-α-ester (D) whereby the composition is vulcanizable by the action of moisture in air at room temperature and/or by application of UV light, said catalyst for vulcanization being selected from the group consisting of dibutyltin diacetate, dibutyltin dioctoate, dibutyltin dilaurate, dibutyltin dioleate, diphenyltin diacetate, dibutyltin dioxide, dibutyltin dimethoxide, dibutylbis(triethoxysiloxy) tin, dibutyltinbenzyl maleate, tetraisopropoxy titanium, tetra-n-butoxy titanium, tetrabis (2-ethylhexoxy) titanium, dipropoxybis (acetylacetona) titanium and titanium isopropoxyoctylene glycol.

* * * * *